(12) United States Patent
Aguilar et al.

(10) Patent No.: US 12,546,980 B2
(45) Date of Patent: Feb. 10, 2026

(54) CONFOCAL MICROSCOPE WITH PHOTON RE-ALLOCATION

(71) Applicants: CENTRE NATIONAL DE LA RECHERCHE SCIENTIFIQUE, Paris (FR); INSTITUT D'OPTIQUE GRADUATE SCHOOL, Palaiseau (FR); UNIVERSITE DE BORDEAUX, Bordeaux (FR)

(72) Inventors: Alberto Aguilar, Bordeaux (FR); Pierre Bon, Villenave d'Ornon (FR)

(73) Assignees: CENTRE NATIONAL DE LA RESERCHE SCIENTIFIQUE, Paris (FR); INSTITUT D' OPTIQUE GRADUATE SCHOOL, Palaiseau (FR); UNIVERSITE DE BORDEAUX, Bordeaux (FR)

( * ) Notice: Subject to any disclaimer, the term of this patent is extended or adjusted under 35 U.S.C. 154(b) by 290 days.

(21) Appl. No.: 18/265,640

(22) PCT Filed: Dec. 9, 2021

(86) PCT No.: PCT/EP2021/085104
§ 371 (c)(1),
(2) Date: Jun. 6, 2023

(87) PCT Pub. No.: WO2022/122981
PCT Pub. Date: Jun. 16, 2022

(65) Prior Publication Data
US 2024/0045188 A1 Feb. 8, 2024

(30) Foreign Application Priority Data
Dec. 10, 2020 (EP) .................... 20306540

(51) Int. Cl.
*G02B 21/00* (2006.01)
*G02B 21/33* (2006.01)

(52) U.S. Cl.
CPC ..... *G02B 21/0032* (2013.01); *G02B 21/0048* (2013.01); *G02B 21/0072* (2013.01); *G02B 21/008* (2013.01); *G02B 21/33* (2013.01)

(58) Field of Classification Search
CPC ............ G02B 21/0032; G02B 21/0048; G02B 21/0072; G02B 21/008; G02B 21/33; G02B 21/082; G02B 27/58
See application file for complete search history.

(56) References Cited

U.S. PATENT DOCUMENTS

2003/0071216 A1* 4/2003 Rabolt ....................... G01J 3/02
250/339.02
2010/0214404 A1* 8/2010 Chen .................. G02B 21/0056
359/290

(Continued)

FOREIGN PATENT DOCUMENTS

DE 10 2013 005 927 A1 10/2014
JP 2011118070 A 6/2011

(Continued)

OTHER PUBLICATIONS

Sheppard, "Super-resolution in Confocal Imaging", Optik, vol. 80, No. 2, pp. 53, 54,1988.

(Continued)

*Primary Examiner* — Mustak Choudhury
(74) *Attorney, Agent, or Firm* — Maier & Maier, PLLC

(57) ABSTRACT

A scanning confocal photon-reassignment microscope is configured to operate in a coherent (reflectance or transmission) imaging mode and having a confocal pinhole the (Continued)

diameter of which is between 2 and 4 Airy units. The microscope can be used to observe viral particles in suspension.

11 Claims, 7 Drawing Sheets

(56) References Cited

U.S. PATENT DOCUMENTS

| | | | | |
|---|---|---|---|---|
| 2014/0146376 | A1* | 5/2014 | Kleppe | G02B 21/0072 |
| | | | | 359/385 |
| 2017/0199362 | A1* | 7/2017 | Schwedt | G02B 21/002 |
| 2019/0033054 | A1* | 1/2019 | Vaupel | G01B 11/06 |
| 2019/0293915 | A1* | 9/2019 | McCluskey | G02B 27/0972 |
| 2020/0386974 | A1* | 12/2020 | Vicidomini | G02B 21/0028 |

FOREIGN PATENT DOCUMENTS

| | | |
|---|---|---|
| JP | 2015505979 A | 2/2015 |
| WO | 2018/226836 A1 | 12/2018 |

OTHER PUBLICATIONS

York, et al., "Instant super-resolution imaging in live cells and embryos via analog image processing", Nat. Methods, vol. 10(11), pp. 1122-1126, 2013.

De Luca, et al., "Re-scan confocal microscopy: scanning twice for better resolution", Biomedical Optics Express, vol. 4, No. 11, Nov. 2013.

Curd, et al., "Construction of an instant structured illumination microscope", Methods, vol. 88, pp. 37-47, 2015.

Roth, "Development of a new microscopy method: Optical Photon Reassignment Microscopy", doctoral thesis, Friedrich Schiller University, Jena (DE), Mar. 29, 2017.

Dubose, et al. "Super-resolution retinal imaging using optically reassigned scanning laser ophthalmology", Nature Photonics, vol. 13, pp. 257-262, Apr. 2019.

Sandison, et al., "Quantitative comparison of background rejection, signal-to-noise ratio, and resolution in confocal and full-field laser scanning microscopes", Applied Optics, vol. 34, No. 19, pp. 3576-3588, 1995.

Mueller, et al., "Image Scanning Microscopy", PRL 104, 198101, (2010).

Larocca, "Development of Multi-modal and Super-resolved Retinal Imaging Systems", Dissertation, Duke University, 2016. Retrieved from https://hdl.handle.net/10161/12239.

Witte, et al., "Concepts in Light Microscopy of Viruses", Viruses, vol. 10, No. 4, p. 202, 2018.

Chen, et al., "Super-Resolution Confocal Microscopy Through Pixel Reassignment", Microscopy and Analysis, 2016.

Aguilar, et al., "Label-free super-resolution imaging below 90-nm using photon-reassignment [version 1; peer review: 3 approved with reservations]", Open Res Europe, 2021.

* cited by examiner

CONFOCAL MICROSCOPE WITH PHOTON RE-ALLOCATION

CROSS-REFERENCE TO RELATED APPLICATIONS

This application is a National Stage of International patent application PCT/EP2021/085104, filed on Dec. 9, 2021, which claims priority to foreign European patent application No. EP 20306540.4, filed on Dec. 10, 2020, the disclosures of which are incorporated by reference in their entirety.

FIELD OF THE INVENTION

The invention relates to the field of optical microscopy.

BACKGROUND

Optical microscopy plays an essential role in biology because it makes it possible to observe living samples at a high rate, unlike, for example, electron microscopy which requires complex preparation operations that are incompatible with the preservation of life. However, its resolving power is necessarily limited by the diffraction of light. According to Abbe's theory, for a conventional optical microscope the maximum resolution d is given by $$d = \frac{\lambda}{2NA}$$

where $\lambda$ is the wavelength of the light used (between 380 nm and 780 nm for visible light) and NA is numerical aperture, which cannot easily exceed a value of 1.4 for biological samples. It follows that resolution in visible light cannot exceed 135 nm, which is unsuitable for the observation of very small structures such as viral particles.

So-called "super-resolution" techniques make it possible to exceed the Abbe resolution limit by exploiting fluorescent markers and/or non-linear effects. These techniques are complex to implement.

Moreover, as biological objects are by nature three-dimensional, it is also necessary to obtain a high spatial resolution in an axial direction (the Abbe limit concerns lateral resolution, in a plane perpendicular to the optical axis). Confocal microscopy makes it possible to obtain images with a very shallow depth of field (of the order of a few hundred nanometers), and therefore to "section" the sample with a view to accessing its three-dimensional structure. This technique is most often associated with the use of fluorescent markers, but it is also possible to use it in reflectance, without markers.

A confocal microscope uses a point illumination source, an image of which is projected onto the sample to be observed by means of an objective. Light from the sample (backscattered light in the case of a reflectance confocal microscope; fluorescent emission when a fluorescent marker is used) is focused on a pinhole optically conjugated to the point source, then detected for example by means of a photomultiplier. The function of the pinhole is to suppress radiation not from the focal plane of the objective, thus achieving optical sectioning. An image of the sample is obtained point by point, by scanning. More precisely, a two-dimensional scan, in the two directions perpendicular to the optical axis, makes it possible to obtain an image of a slice of the sample centered on the focal plane of the objective. By adding thereto an axial scan of this focal plane, a three-dimensional image is obtained.

The thickness of the slice decreases, and therefore axial resolution improves, as the diameter of the pinhole decreases, but the gain is low for decreases beyond 1 Airy unit (AU). The Airy unit is the diameter of the Airy spot of the microscope, and is equal to $$\frac{\lambda}{2NA}.$$

Confocal microscopy allows a gain in lateral resolution, with respect to the Abbe limit, that may theoretically be as much as 30%, using a pinhole with a diameter of less than 1 AU. However, this is obtained at the cost of a degradation in signal-to-noise ratio.

The photon-reassignment technique, proposed for the first time in (Sheppard 1988), allows the lateral resolution of a confocal microscope to be improved by a factor of 2 in principle. The idea behind this technique is to replace the photomultiplier, or more generally the point radiation detector, with a matrix detector which makes it possible to acquire one elementary image for each acquisition point. The image is then resized (ideally scaled down by a factor of 2) by digital or optical means before moving to the next scan point. The final image is obtained by integrating the various successively acquired scan images, each shifted by one scan step relative to the previous image.

A purely optical implementation of the photon-reassignment technique is described in (York 2013), (De Luca 2013), (Curd 2015) and (Roth 2017). It consists in applying a first angular scan to the illuminating beam, applying an inverse angular scan to the beam from the sample, then applying to the same beam from the sample a second angular scan, synchronized with the first scan. The second angular scan has an amplitude normalized with respect to the cross-sectional area of the beam greater, ideally by a factor of two, than the first scan. "Normalized with respect to the cross-sectional area of the beam" means that if $\alpha$ is the ratio between the amplitude of the second angular scan and the amplitude of the first angular scan and M is the ratio between the cross-sectional area of the beam from the sample and the cross-sectional area of the illuminating beam, it is the magnitude $\alpha/M$ which must be greater than 1 and ideally equal to 2.

As in conventional confocal microscopy, it is possible to parallelize acquisition using a matrix array of pinholes and matrix arrays of microlenses—see for example the aforementioned article (York 2013).

Photon reassignment has in particular been applied to confocal fluorescence microscopy, see for example the aforementioned articles (York 2013), (De Luca 2013) and (Curd 2015), in which a gain in lateral resolution of a factor of 1.5 was observed. To the knowledge of the inventor, to date the only application of photon reassignment in reflectance is described in (DuBose 2019). However, in this article it is not a question of a microscope but of an ophthalmoscope in which the objective is replaced by the crystalline lens of a patient's eye, and thus by a lens having a low numerical aperture, and consequently a lateral resolution of the order of tens of microns.

SUMMARY OF THE INVENTION

The invention aims to provide a scanning confocal microscope with improved resolution in three dimensions (laterally and axially). In accordance with the invention, this aim is achieved through use, in a coherent imaging mode, of a confocal pinhole having a diameter (or, more generally, a greatest lateral dimension) of between 2 and 4 Airy units, and ideally equal to 3 Airy units. The present inventor has realized that, in a coherent imaging mode, lateral resolution increases with the aperture of the pinhole up to double the Abbe limit for a diameter of 3 Airy units. In contrast, in a fluorescence operating mode, lateral resolution is independent of the diameter of the pinhole. By coherent imaging, what is meant is a regime in which the detected photons are illumination photons that have undergone only elastic scattering by the sample and the optical systems of the microscope; it may for example be a question of reflectance imaging (case considered in detail below) or transmission imaging. In contrast, fluorescence imaging or Raman scattering imaging is considered incoherent because the illumination photons undergo inelastic scattering.

The use of a pinhole of diameter equal to 3 Airy units further optimizes background rejection (background is however decreased by about 30% compared to the case of a confocal microscope without photon reassignment and with a pinhole of 1 AU). The notion of "background rejection" is precisely defined in (Sandison 1995).

Furthermore, the inventor has discovered that, under these conditions, axial resolution is increased by a factor of 1.5 compared to the case of a conventional confocal microscope.

In the end, using illumination of wavelength equal to 445 nm and an immersion objective with NA=1.3, it is possible to obtain a spatial resolution of $(86 \times 86 \times 248)$ nm$^3$. Furthermore, this is without the need for fluorescent labeling, this making application of the technique simpler and more general.

One subject of the invention is therefore a scanning confocal photon-reassignment microscope, comprising:
  a light source configured to generate at least one spatially coherent illuminating light beam at an illumination wavelength;
  a first optical system configured to apply an angular scan to said illuminating light beam;
  at least one microscope objective configured to receive as input the illuminating light beam output from the first optical system and to focus it on a sample, and to collect and collimate a light beam elastically scattered by said sample, called the signal beam;
  a second optical system, which is able to coincide in whole or in part with the first optical system, and which is configured to receive as input the signal beam collimated by the microscope objective, to apply to it an angular scan opposite to that applied to the illuminating light beam and to focus it in a first focal plane;
  a pinhole arranged in said first focal plane;
  a matrix image sensor arranged in the second focal plane; and
  a photon-reassigning means interacting with the matrix image sensor to reconstruct an image of the sample;
characterized in that:
  the microscope objective and the second optical system are configured to focus on the matrix image sensor said signal beam at the illumination wavelength; and in that
  the pinhole has a diameter, or greatest lateral dimension, of between 2 and 4 Airy units.

According to particular embodiments of such a scanning confocal microscope:

At least the second optical system may comprise a beam splitter to split the signal beam from the illuminating light beam.

The light source may be configured to emit a blue, violet or near-ultraviolet illuminating light beam.

The light source may be a laser.

The microscope objective may be an immersion objective having a numerical aperture greater than or equal to 1.

The photon-reassigning means may comprise a third optical system configured to collect the signal beam having passed through the pinhole, to collimate it and to apply to it an angular scan synchronized with that applied to the illuminating light beam and such that the product of its amplitude and the cross-sectional area of the collimated light beam in the third optical system is greater than the product of the amplitude of the scan applied by the second optical system and the cross-sectional area of the collimated light beam in the second optical system, and to focus it in a second focal plane; the assembly consisting of the microscope objective, the second optical system and the third optical system being configured to focus on the matrix image sensor said signal beam at the illumination wavelength.

The third optical system may be configured to apply to the signal beam an angular scan such that the amplitude of said scan multiplied by the cross-sectional area of the beam is between 1.8 and 2.2 times the product of the amplitude of the angular scan applied to the illuminating light beam by the first optical system and the cross-sectional area of said beam.

The scanning confocal microscope may be configured to operate in reflectance and:
  the first optical system may comprise a first lens to focus the illuminating light beam, a pinhole arranged in the focal plane of said first lens to perform spatial filtering of the illuminating light beam, a beam splitter to reflect a portion of said beam, a second lens to collimate said portion of the illuminating beam, a first oscillating mirror or system of oscillating mirrors to apply to it said angular scan and an afocal system comprising a third and a fourth lens;
  the second optical system may comprise said afocal system, said first oscillating mirror or system of oscillating mirrors, said second lens and said beam splitter, the latter being configured to transmit a portion of the signal beam, backscattered by the sample; and
  the third optical system may comprise a fifth lens to collimate the signal beam having passed through the pinhole, a second oscillating mirror or system of oscillating mirrors to apply to it said angular scan synchronized with that applied to the illuminating light beam and a sixth lens to focus it in the second focal plane.

The light source may be configured to generate a plurality of said illuminating light beams in parallel, these propagating through the first optical system, whereby the microscope objective collects a plurality of respective signal beams, which then propagate along said second optical system, the microscope further comprising a matrix array of pinholes arranged in said second focal plane, one for each said backscattered light beam.

In this case, the scanning confocal microscope may be configured to operate in reflectance and:
  the light source may comprise a first array of microlenses to generate and focus said plurality of illuminating light beams;
  the scanning confocal microscope may comprise at least one oscillating mirror having a reflective front face and a reflective rear face, the front face forming part of the first and second optical system and the rear face forming part of the third optical system; and the third optical system may comprise a second array of microlenses to increase the cross-sectional area of the backscattered light beams incident on the rear face of the oscillating mirror by a factor between 1.8 and 2.2.

Another subject of the invention is the use of such a scanning confocal microscope to observe viral particles in suspension.

Yet another subject of the invention is a method for observing a sample, comprising the steps of:
  generating at least one spatially coherent and collimated illuminating light beam at an illumination wavelength;
  applying to it an angular scan;
  focusing it on the sample by means of a microscope objective;
  collecting, by means of said or of another microscope objective, a light beam elastically scattered by the sample at said illumination wavelength, called the signal beam;
  applying to the signal beam an angular scan opposite to that applied to the illuminating light beam and focusing it in a first focal plane;
  carrying out spatial filtering of the signal beam by means of a pinhole arranged in said first focal plane, the pinhole having a diameter, or a greatest lateral dimension, of between 2 and 4 Airy units;
  collecting the signal beam having passed through the pinhole, collimating it and applying to it an angular scan synchronized with that applied to the illuminating light beam and such that the product of its amplitude and the cross-sectional area of the signal beam is greater than the product of the amplitude of the angular scan applied to the illuminating light beam and its diameter and focusing it in a second focal plane; and
  detecting the signal beam by means of a matrix image sensor arranged in the second focal plane.

Yet another subject of the invention is a method for observing a sample, comprising the steps of:
  generating at least one spatially coherent and collimated illuminating light beam (FE) at an illumination wavelength;
  applying to it an angular scan;
  focusing it on the sample by means of a microscope objective;
  collecting, by means of said or of another microscope objective, a light beam elastically scattered by the sample at said illumination wavelength, called the signal beam;
  applying to the signal beam an angular scan opposite to that applied to the illuminating light beam and focusing it in a first focal plane;
  carrying out spatial filtering of the signal beam by means of a pinhole arranged in said first focal plane, the pinhole having a diameter, or a greatest lateral dimension, of between 2 and 4 Airy units;
  detecting the signal beam having passed through the pinhole by means of a matrix image sensor arranged in the second focal plane, the acquisition rate of which is synchronous with the angular scan of the illuminating light beam; and applying digital photon-reassignment processing to the images acquired by the matrix image sensor.

BRIEF DESCRIPTION OF THE DRAWINGS

Other features, details and advantages of the invention will become apparent on reading the description given with reference to the appended figures, which are given by way of example and which show, respectively.

DETAILED DESCRIPTION

Figure 1:
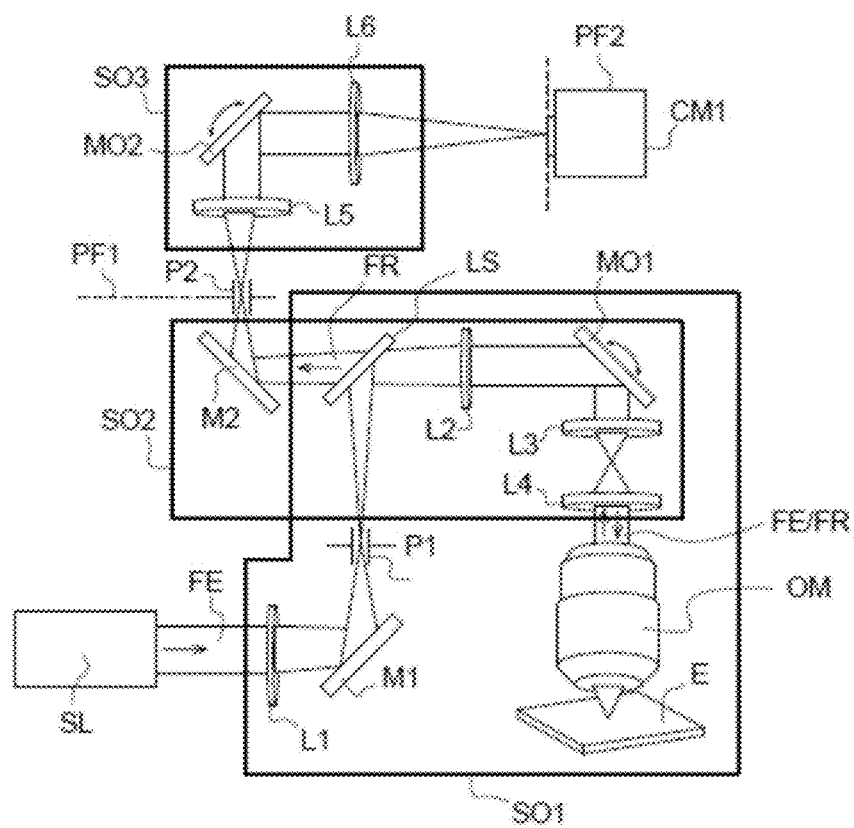
FIG. 1, a diagram of a confocal photon-reassignment microscope according to a first embodiment of the invention.

As explained above, the photon-reassignment technique consists in recording the image of a sample through a pinhole when the sample is illuminated by a very focused light beam. This image taken through the pinhole is positioned at a specific location on an acquisition camera with a separation s between two points of the scan of the sample and a de-magnification M. The signal $I(\vec{x}_s, \vec{x}_d)$ recorded by the camera, where $\vec{x}_s$ represents the coordinates in the plane of the sample and $\vec{x}_d$ the coordinates in the plane of the detector, is given by $$I(\vec{x}_s, \vec{x}_d) = \iint H_e(\vec{x}')U(\vec{x}'-\vec{x}_s)H_d(\vec{x}'-\vec{x}_d)d^2\vec{x}' \tag{1}$$

where $H_e$ is the illumination (or excitation) spread function, $H_d$ the detection spread function and U the field scattered by the sample.

Equation (1) assumes the sample is moved to achieve the scan, whereas it is more practical to keep the sample stationary and move the illuminating beam. Mathematically this corresponds to the change of coordinates $\vec{x}_s = -\vec{x}_1$, $\vec{x}_d = \vec{x}_2 - \vec{x}_1$, $\vec{x}' = \vec{x} - \vec{x}_1$, this giving $$I(\vec{x}_1, \vec{x}_2) = \iint H_e(\vec{x}-\vec{x}_1)H_d(\vec{x}-\vec{x}_2)U(\vec{x})d^2\vec{x} \tag{2}$$

If the detector is sufficiently extensive compared to the size of the pinhole, it is possible to neglect the weighting factor of the latter. If a demagnification factor M is moreover introduced, it is possible to write $\vec{x}_r = (1-M)\vec{x}_1 - M\vec{x}_2$ and (2) becomes $$I(\vec{x}_r) = \iiiint H_e(\vec{x}-\vec{x}_r-M\vec{x}_d)H_d(\vec{x}-\vec{x}_r-(M-1)\vec{x}_d)U(\vec{x})d^2\vec{x}\,d^2\vec{x}_d \tag{3}$$

The optical transfer function of the system, $C(\vec{k})$, $\vec{k}$ denoting spatial-frequency coordinates, may be written:

$$C(\vec{k}) = C_e[(M-1)\vec{k}]C_d[M\vec{k}] \tag{4}$$

with $C_e$, $C_d$ the illumination and detection optical transfer functions, respectively. Ideally $$C_e(\vec{k}) = C_e(\vec{k}) = 1 \text{ if } 0 < k \le k_0 = \frac{2\pi}{\lambda}, \text{ and } 0$$

otherwise. It will be noted that the support of $C_e(\vec{k})$ has a radius proportional to $1/(M-1)$. It has been shown in (Sheppard 1988) and (DuBose 2019) that the maximum cutoff frequency of the optical transfer function takes its maximum value $k_{max}=2k_0$ for $M=\frac{1}{2}$, this corresponding to a magnification by a factor of 2, leading to a doubling of lateral resolution compared to conventional confocal microscopy. This magnification may be obtained via a re-scan of amplitude equal to 2 times the amplitude required to compensate for the scan of the sample by the illumination spot. As a variant, the re-scan could have an amplitude equal to the amplitude required to compensate for the scan of the sample by the illumination spot, the magnification being provided by a lens system. As will be discussed below with reference to FIG. 2, intermediate solutions are also possible; more generally, what matters is that the product of multiplication of the amplitude of the re-scan divided by the amplitude of the illumination scan by the optical magnification is approximately equal to 2.

Generally, a confocal photon-reassignment microscope according to the invention comprises: a light source; a first optical system interacting with the light source; an objective to scan the surface of a sample with a focused light beam; a second optical system to collect the light backscattered or transmitted by the sample, to compensate for the angular deflection introduced to perform the scan and to focus it; a pinhole in the focal plane of the second optical system to perform confocal filtering; and a third optical system to apply a "re-scan" to the light beam from the pinhole and to focus it on a camera. The various optical systems may partly coincide, this making it possible to limit the number of optical components.

FIG. 1 shows the optical diagram of a confocal photon-reassignment microscope according to a first embodiment of the invention.

The light source SL is a laser emitting a light beam FE (illuminating beam) of wavelength $\lambda=445$ nm. The beam FE is focused by a first convergent lens L1 (focal length 200 mm) and spatially purified by a first pinhole P1 with a diameter of 50 μm located in the focal plane of the lens.

The spatially filtered illuminating beam FE is reflected by a beam splitter LS (50% transmission-50% reflection) and collimated by a second convergent lens L2 (focal length 200 mm). A first system of two oscillating mirrors (just one, MO1, has been shown for the sake of simplicity), for example of galvanometer type, imparts a time-varying deflection to the beam FE, so as to perform a two-dimensional scan. The beam FE thus deflected is focused on a sample E by a microscope objective OM (apochromatic objective with immersion in silicone oil, magnification 60×, numerical aperture NA=1.3) such that the focal spot—the diameter of which is diffraction limited—scans the surface of the sample. If the sample is transparent or semi-transparent, the focal point may be located below the surface, at a depth which may be varied by moving the objective or the sample axially, this allowing three-dimensional images to be obtained by tomography.

An afocal system made up of the convergent lenses L3, L4 ensures an optical conjugation relationship between the pupil of the objective and the midpoint of the two oscillating mirrors (or the single oscillating mirror MO1); typically, the distance between the two oscillating mirrors may be neglected with respect to the focal length of L3. All the optical components comprised between the lens L1 and the objective OM—including a non-essential mirror M1, which deflects the beam FE upstream of the pinhole P1 to make the device more compact—form a first optical system, or illuminating optical system, SO1.

The light backscattered by the sample is collected by the objective OM, which forms a signal beam FR that propagates along—in reverse—the same optical path as the illuminating beam, up to the beam splitter LS. This optical path includes the pair of oscillating mirrors MO1, which compensates for the time-varying deflection given to the illuminating beam to scan the sample. The component of FR reflected by the splitter LS is lost, whereas the component that passes therethrough is intended to be detected and is reflected through 90° by a mirror M2 (which is non-essential and intended solely to make the setup more compact). The assembly L4, L3, MO1, L2, LS, M2 forms a second optical system, or collecting optical system, SO2. It will be noted that SO2 partly coincides with SO because the microscope works in reflectance.

The lens L2 has a double function: to collimate the illuminating beam, which diverges after having been focused by L1 and spatially filtered by P1, and to focus the signal beam FR which exits collimated from the objective OM and the afocal system L3, L4. A second pinhole P2 is placed in the focal plane PF1 of the lens L2 where the signal beam FR is focused. Unlike the pinhole P1, P2 is an essential feature of the invention and the dimensioning of its diameter (or, more generally, of its largest lateral dimension, in the case where it is not circular) has a large impact on the performance of the microscope. This will be discussed in detail below with reference to FIG. 2.

It is important to emphasize that FIG. 1 is not to scale. In fact, the distance between the system of oscillating mirrors MO1 and L3 must be equal to the distance between L3 and the focal plane PF1. Moreover, the lenses L2 and L5 form a second afocal system which, in the embodiment of FIG. 1, has unit magnification.

As the beam FR, on having passed through the pinhole P2, is divergent, it is collimated by a convergent lens L5 (focal length 200 mm) and directed toward a second system of two oscillating mirrors (just one, MO2, has been shown for the sake of simplicity), for example of galvanometer type. This second system of oscillating mirrors imparts a time-varying deflection to the beam FR, so as to perform a two-dimensional scan that is the origin of the photon reassignment. This deflection is synchronous with the deflection imparted to the beam FR and has an amplitude $\alpha_2$ greater than the amplitude α1 of the deflection imparted by MO1.

More precisely, the deflection imparted by the second system of oscillating mirrors MO2 is ideally greater by a factor equal to 2 (or more generally between 1.8 and 2.2) than that imparted by the first system of oscillating mirrors MO1.

More generally, the magnification of the afocal system L2-L5 may have a value G different from 1, in which case the cross-sectional area of the beam FR when it strikes MO2 is greater by a factor M than the cross-sectional area of the same beam when it strikes MO1. In this case, it is the product $M\alpha_2$ that must be greater than, and ideally double, $\alpha_1$.

The beam deflected by the system of oscillating mirrors MO2 is focused by a convergent lens L6 (focal length 200 mm) in a second focal plane PF2.

The assembly L5, MO2, L6 forms a third optical system, or photon-reassigning optical system, SO3.

A matrix image sensor CMI is arranged in the focal plane PF2 of the lens L6. Its integration time is greater than or equal to half a scanning period of the system of oscillating mirrors MO2, this making it possible to compute the integrals of equation (3) analogically. As a variant, the integration time may be shorter, and the image acquisition rate higher, but in this case it is necessary to perform a digital integration after the acquisition.

Figure 2:
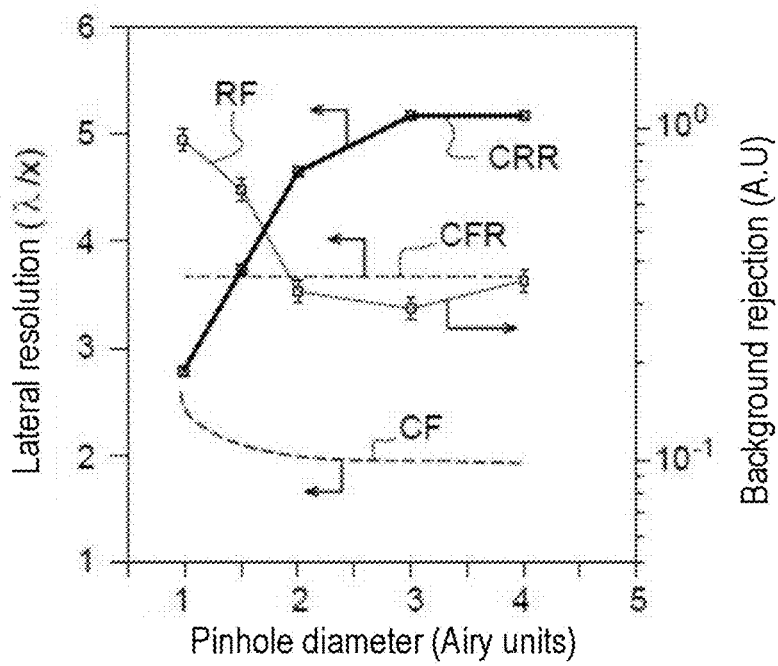
FIG. 2, graphs illustrating how the performance of the confocal microscope of FIG. 1 depends on the diameter of the confocal pinhole.

FIG. 2 illustrates the dependence of certain performance criteria of the microscope of FIG. 1 (but the validity of the results is more general) on the diameter of the pinhole P2, and allows them to be compared to those obtained by means of other confocal microscopy techniques. The diameter of P2 is expressed in Airy units AU. As explained above, the Airy unit is the diameter of the Airy spot of the microscope, and is equal to $$\frac{\lambda}{2NA},$$

NA being the numerical aperture of the objective OM and $\lambda$ the wavelength in question.

The curves CRR, CFR and CF plot the lateral resolution of the microscope of FIG. 1, of an incoherent confocal photon-reassignment microscope (for example a fluorescence-based one), and of a conventional confocal microscope, respectively. More precisely, the curves show how the parameter "x" depends on the diameter of the pinhole, "x" being such that the lateral resolution is given by $\lambda/x$. It will be noted that:

In the case of a conventional confocal microscope (curve CF), x increases when the diameter of the pinhole decreases; for this reason, a pinhole the diameter of which is about 1 AU is generally chosen.

In the case of an incoherent confocal photon-reassignment microscope (curve CFR), lateral resolution is independent of the diameter of the pinhole and is better by a factor of about 1.5 than that of the conventional confocal microscope.

In the case of a coherent confocal photon-reassignment microscope, according to the invention (curve CRR), lateral resolution improves as the diameter of the pinhole increases, before leveling off after said diameter reaches 3 AU. From about 2 AU, lateral resolution is significantly better than in coherent microscopy. Under optimal conditions (3 AU), the lateral resolution is twice as good as in conventional confocal microscopy.

The curve RF illustrates the variation in background rejection as a function of diameter of the pinhole (this variation is the same in all three techniques considered above). Background rejection decreases between 1 and 2 AU, then stabilizes between 2 and 4 AU at a value about 30% lower than that obtained for a diameter of 1 AU, before falling sharply beyond 4 AU (not shown). The slight rise between 3 and 4 AU is likely an artefact.

In conclusion, for pinhole diameters between 2 and 4 AU, the invention makes it possible to obtain a doubling of lateral resolution compared to a confocal microscope without photon reassignment and with a pinhole that is 1 AU in size, at the cost of a contained degradation in background rejection.

The improvement in lateral resolution obtained by virtue of the invention has been demonstrated experimentally.

Figure 3:
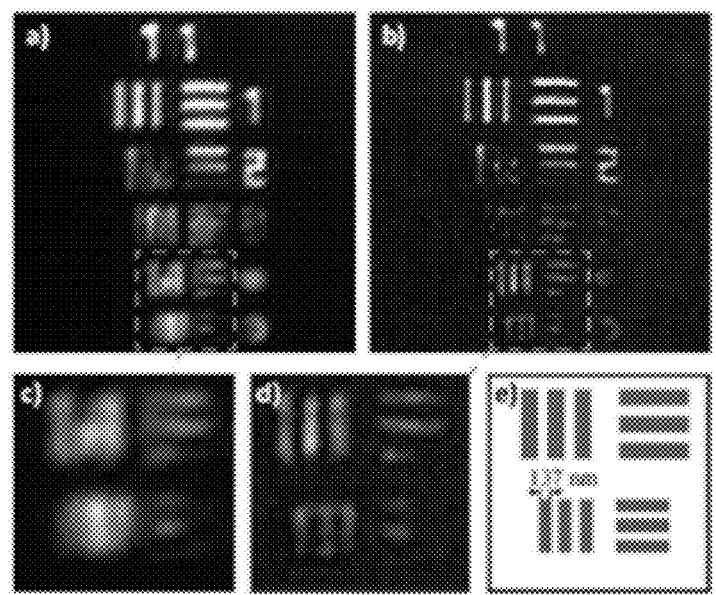
FIG. 3, experimental results demonstrating a technical effect of the invention.

FIG. 3 shows images of a USAF resolution test chart (11th group of elements) acquired with the microscope of FIG. 1 (panels labelled b) and d) in the figure, panel d) being an enlargement of the area framed by a dashed line in panel b)) and with a confocal microscope without photon reassignment using the same light source and the same objective (panels a) and c)). The former are much sharper. Panel e) illustrates the pattern of the test chart. The images were obtained without deconvolution.

Figure 4:
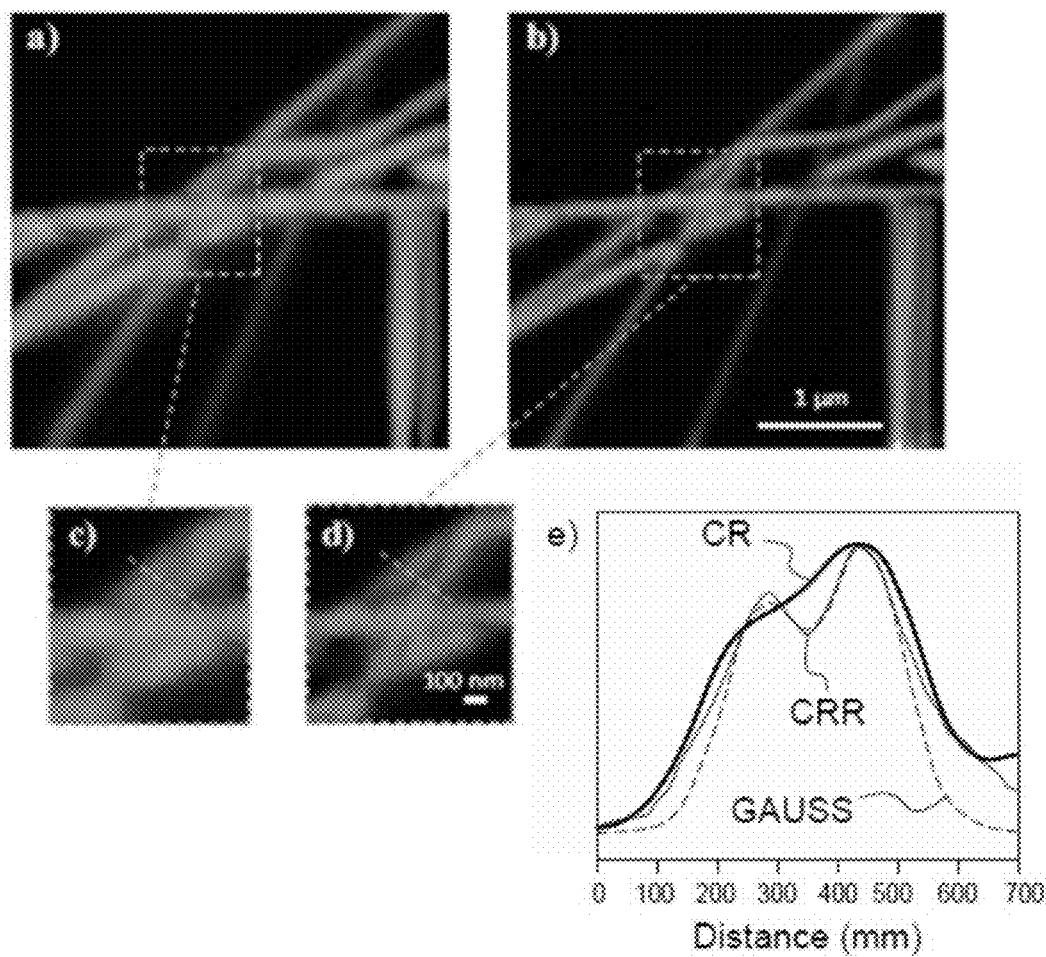
FIG. 4, experimental results demonstrating a technical effect of the invention.

FIG. 4 shows images of silver nanorods (diameter: 90 nm +/−5 nm; length: a few tens of microns) immersed in a refractive-index-matching oil, acquired with the microscope of FIG. 1 (panels labelled b) and d) in the figure, panel d) being an enlargement of the area framed by a dashed line in panel b)) and with a confocal microscope without photon reassignment using the same light source and the same objective (panels a) and c)). The former are much sharper. Panel e) illustrates profiles extracted from panels c) and d) along the dashed lines: the curve CRR corresponds to panel d) and allows two nanorods to be distinguished between, which nanorods are not resolved in the curve CR corresponding to panel c). The curve GAUSS is a Gaussian fit of CRR and allows the diameters of the nanorods to be estimated: the full widths at half maximum of the two Gaussian distributions are 92.6 nm and 91.2 nm, this being consistent with the expected values.

Figure 5:
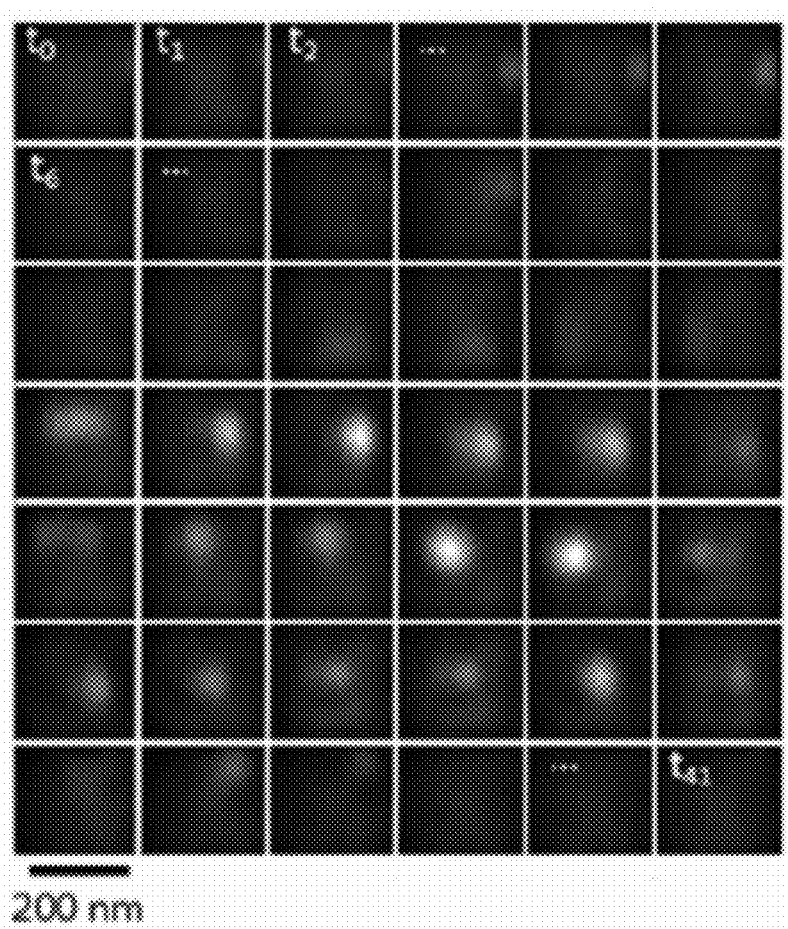
FIG. 5, experimental results demonstrating a technical effect of the invention.

A microscope according to the invention may be used, inter alia, to detect viruses. FIG. 5 shows images of silica particles of about 100 nm diameter—which are therefore comparable to viral particles both in terms of diameter and of refractive index—in free diffusion in an aqueous solution. The images were acquired by means of a microscope of the type of FIG. 1 but with illumination at a wavelength of 400 nm. The various images correspond to successive times, separated by 4 s. The diameter of the particles, measured in focused images, was 105 nm.

Figure 6:
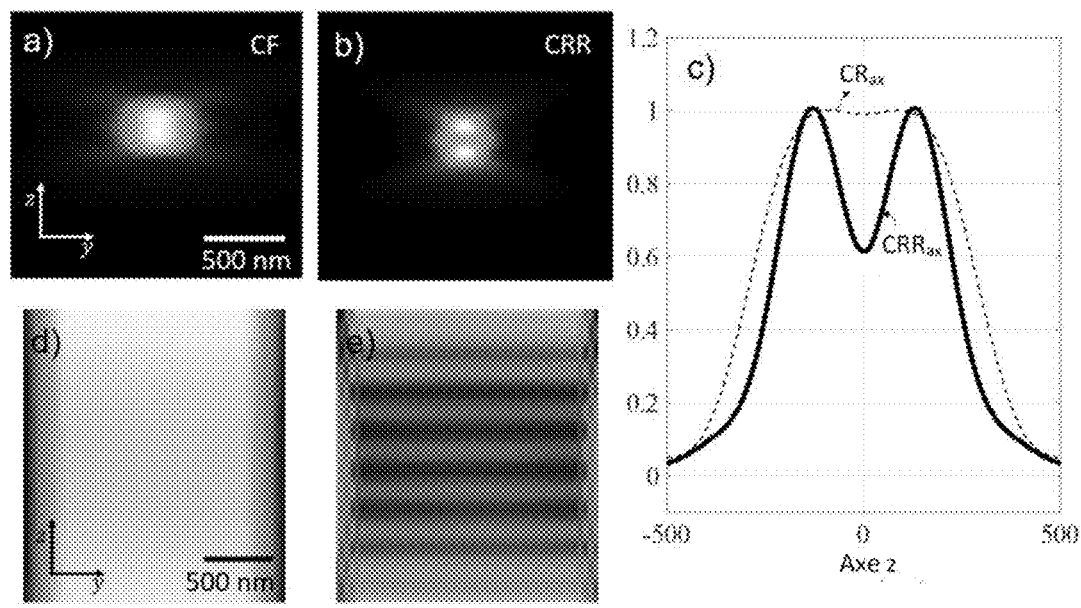
FIG. 6 and FIG. 7 results of numerical simulations demonstrating another technical effect of the invention.

The improvement in axial resolution was demonstrated by means of numerical simulations. Panels a) and b) of FIG. 6 show two images of two superposed balls of sub-micron dimensions. While in the case of conventional confocal imaging (panel a)) the images of the two balls are not resolved, the method of the invention is able to distinguish between them, with a pinhole diameter equal to 3 AU (illumination wavelength: 455 nm, objective numerical aperture 1.3). Panel c) of FIG. 6 is a graph of the intensity measured along a z-axis passing through the center of the two balls (curve $CF_{ax}$ for conventional confocal microscopy and curve $CRR_{ax}$ for the method of the invention). This confirms that what is seen in panel b) is indeed an improvement in resolution and not an aliasing effect. Panels d) and e) show images of an axially oriented periodic structure; the periodicity is visible in the image of panel e), which was obtained by the method of the invention, but not in the image of panel d), which corresponds to conventional confocal microscopy.

Figure 7:
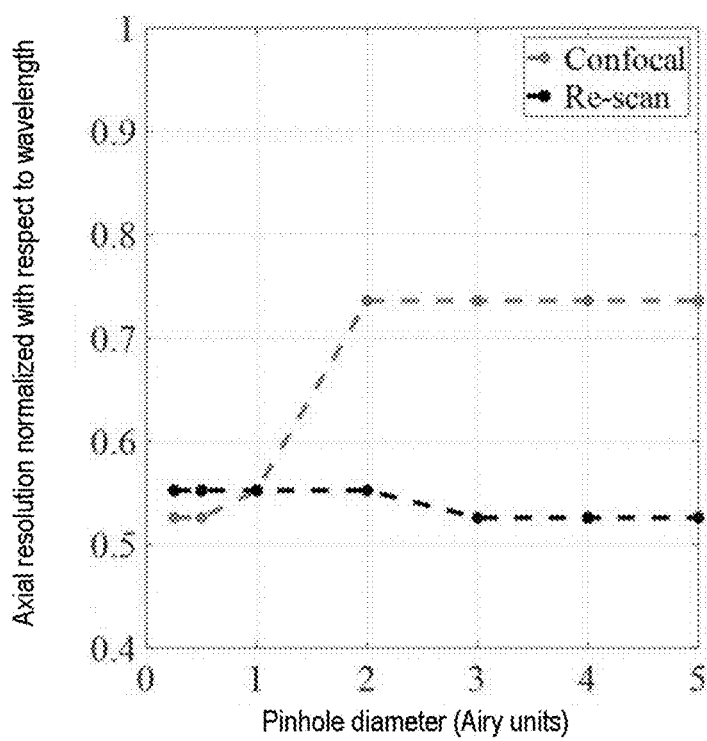

FIG. 7 illustrates the dependence of axial resolution on the pinhole diameter for conventional confocal microscopy (light line "Confocal") and for the method according to the invention (dark line "Re-scan"). It may be seen that, in the case of the invention, axial resolution depends weakly on the diameter of the pinhole, although it improves slightly for diameters greater than 2 AU. Furthermore, for a pinhole diameter greater than or equal to 1 AU, the invention makes it possible to achieve a significantly better axial resolution than conventional confocal microscopy.

Figure 8:
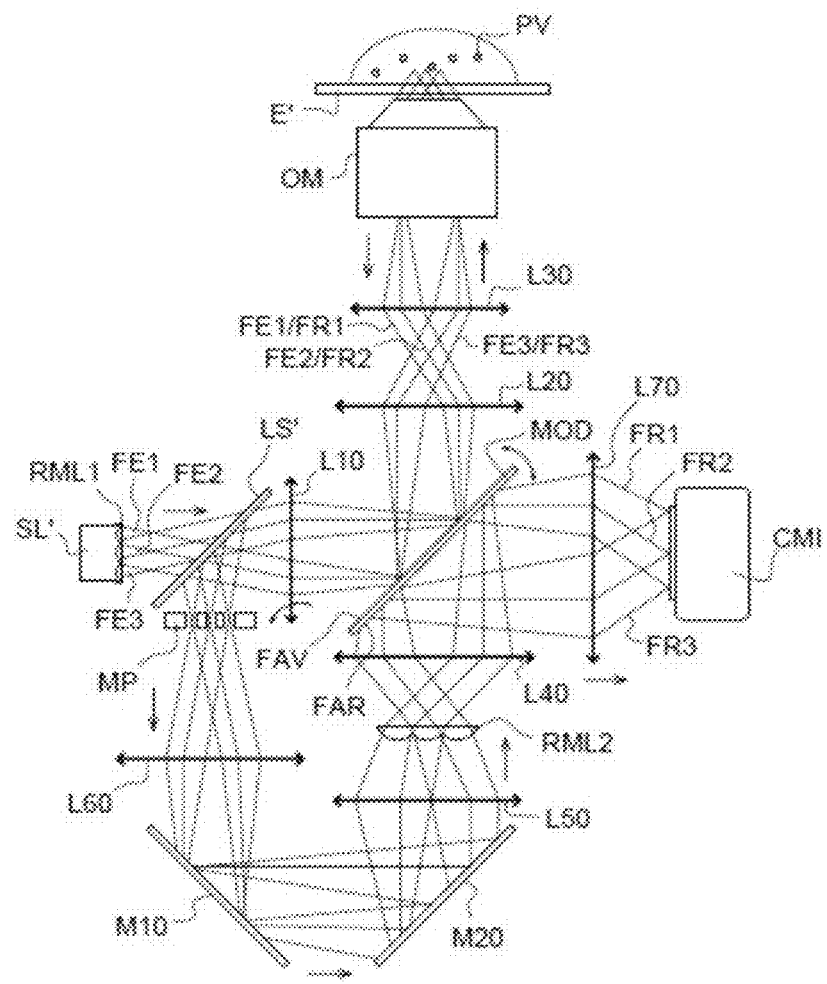
FIG. 8, a diagram of a confocal photon-reassignment microscope according to a second embodiment of the invention.

The microscope of FIG. 1 has a limited field of view—or requires long acquisition times—because it uses a single focused beam. FIG. 8 illustrates an alternative embodiment that makes it possible to overcome this limitation through massive parallelization. This setup uses a matrix array of microlenses to create a series of source points. This makes it possible to parallelize the measurement in the plane of the sample so as to increase speed (only the very small region between 2 measurement points is scanned) while maintaining a large field of view. The image of each of the source points is filtered by means of a matrix array of filter holes. In order to increase lateral resolution by a factor of 2, each of the points is subjected to a re-scan with a reduction by a factor of 2 in its size by means of a second matrix array of microlenses. This approach makes it possible to achieve imaging tending toward the kHz over fields of view of at least 50×50 µm² by parallelizing 50×50 measurement points in the field (1 confocal measurement point every 1 µm in the sample) and a lateral resolution better than 100 nm, while remaining within the imaging range of visible or near UV wavelengths.

More precisely, the apparatus of FIG. 8 comprises a light source SL' (for example, but not necessarily a laser) equipped with a first matrix array of microlenses RML1 that generates a plurality of focused illuminating beams FE1, FE2, FE3 (only three have been shown, but it will typically be a question of a two-dimensional matrix array of several hundred beams). These beams pass through a beam splitter LS' then, having become divergent, are refocused by a convergent lens L10 onto the front face FAV of an oscillating mirror MOD that is reflective on both sides; it may for example be a question of a resonant mirror, so as to increase scan speed in order to "freeze" the movement of the particles in suspension, in the case of an application to the detection of viruses. The scan in the other direction is performed at a lower speed, to make the focal point follow a "serpentine" path; it may therefore be obtained by means of a galvo mirror that is also reflective on both sides (not shown).

The beams reflected by the oscillating mirrors are focused on a sample E' (a drop of aqueous solution containing viral particles PV in suspension, deposited on a microscope slide) by a microscope objective OM (apochromatic objective with immersion in silicone oil, magnification 60×, numerical aperture NA=1.3) such that the focal spot—the diameter of which is diffraction limited—scans the surface of the sample. An afocal system made up of the convergent lenses L20, L30 ensures an optical conjugation relationship between the pupil of the objective and the oscillating mirrors.

The beams FR1, FR2, FR3 backscattered by the sample E' pass through the afocal system L20, L30 in the opposite direction, are reflected by the front face FAV of the mirror MOD to compensate for the scan of the illuminating beams, are refocused by the lens L10 and reflected by the beam splitter LS'. They then undergo filtering by a matrix array of pinholes MP the function and size of which are similar to those of the pinhole P2 of FIG. 1. Two convergent lenses L60, L50 forming an afocal system and two mirrors M10, M20 (optional) make it possible to direct the beams from the matrix array of pinholes MP onto a second array of convergent microlenses RML2, which focus the beams, thereby reducing by a factor of two the size of each focal point. After having passed through another convergent lens L40, the beams FR1-FR3 are reflected by the rear face FAR of the resonant mirror MOD and by the rear face of the galvo mirror (not shown) for the purposes of photon reassignment. The combined effect of the afocal system L60, L50, of the lens L40 and of the array of microlenses RML2 is to double the cross-sectional area of each signal beam striking the resonant mirror MOD. This is necessary because the amplitude of the re-scan is necessarily equal to the amplitude of the scan of the illuminating beam.

A final convergent lens L70 focuses the signal beams onto the matrix image sensor CMI. The function of the array of microlenses RML2 is to halve the cross-sectional area of the focal points of the signal beams.

Figure 9:
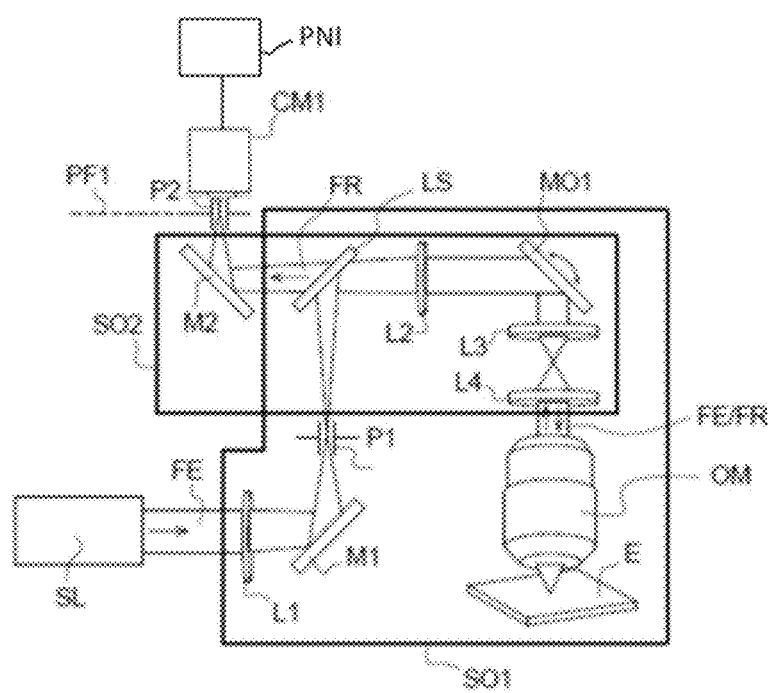
FIG. 9, a diagram of a confocal photon-reassignment microscope according to a third embodiment of the invention.

The embodiments of FIG. 1 and FIG. 8 achieve photon reassignment through purely optical means, by virtue of a scan of the signal beam that is synchronous with the scan of the illuminating beam and that has an appropriate amplitude (i.e. a "re-scan"). However, it is also possible to achieve photon reassignment by means of digital processing. In this case, the camera CMI, the acquisition rate of which is synchronized with the oscillating mirror MO1, is typically arranged level with the pinhole P2, which may be integrated into the camera itself. The digital processing—as for example described in (Mueller 2010)—is implemented by a processor PNI which receives as input the images acquired by the camera CMI. The third optical system SO3 may be omitted. A microscope according to this embodiment is illustrated in FIG. 9. Photon reassignment may also be achieved digitally in the parallel architecture of FIG. 8.

The invention has been described with reference to two particular embodiments, but it is not limited thereto.

For example, it may be adapted to the case of a transmission confocal microscope. In this case, two microscope objectives are required—one to illuminate a point of the sample and the other to collect the transmitted light. Furthermore, the first and the second optical system must be completely disjoint, this requiring more components.

In general, the scan of the sample by the focused light beam and the photon-reassignment scan are two-dimensional. In certain cases, however, a scan in a single dimension may be sufficient, this allowing the number of oscillating mirrors to be reduced.

Optical filtering by the lens L1 and the pinhole P1, or by the matrix array of microlenses RML1 and the matrix array of pinholes MP, is not strictly necessary, provided that the illumination has a sufficient spatial coherence (Strehl ratio>80%); in the case of a parallelized system such as that of FIG. 8, the coherence must be understood to be at the scale of each elementary beam, a global coherence not being required. Likewise, the optical relays L3-L4 and L20-L30 are not essential in principle, but their presence is generally required to ensure that the oscillating mirror MO1 or MOD is optically conjugated with the pupil of the objective, failing which, at large deflection angles, the pupil of the objective is not fully illuminated, this reducing numerical aperture and therefore spatial resolution. Likewise, use of a laser as illumination source is not essential.

At least some lenses might not be convergent but divergent and/or be replaced by other focusing or defocusing devices, concave or convex mirrors for example.

The beam splitter LS could, in principle, be replaced by a splitter cube, but this is disadvantageous because of the spurious reflections that the latter component would introduce.

More generally, optical setups other than those illustrated in FIG. 1 and FIG. 8 may be used to produce the various constituent optical systems of a microscope according to the invention. In the description of the figures, furthermore, the dimensions of the optical elements have been given merely by way of example.

The illumination wavelength may be any wavelength, but use of green light (495-570 nm), blue light (450-495 nm) or violet light (380-450 nm), or even light in the near ultraviolet (300-380 nm) is preferred because it allows a lateral spatial resolution of the order of 100 nm or less to be obtained while avoiding the technical difficulties associated with using shorter wavelengths. Likewise, the choice of an immersion-microscope objective of high numerical aperture (greater than or equal to 1) makes it possible to maximize spatial resolution, but is not essential in itself.

Lastly, detection and identification of viral particles is merely one example of application of a parallelized microscope of the type illustrated in FIG. 8.

REFERENCES (Sheppard 1988): C. J. R. Sheppard, "Super-resolution in Confocal Imaging", Optik 80, No. 2, pages 53, 54.
(York 2013): A. G. York et al. "Instant super-resolution imaging in live cells and embryos via analog image processing", Nat. Methods 2013, November, 10(11), pages 1122-1126.
(De Luca 2013): G. M. R. De Luca "Re-scan confocal microscopy: scanning twice for better resolution" Biomedical Optics Express, Vol. 4, No. 11, November 2013.
(Curd 2015): A. Curd et al. "Construction of an instant structured illumination microscope", Methods 88 (2015) pages 37-47.
(Roth 2017): S. Roth "Development of a new microscopy method: Optical Photon Reassignment Microscopy", doctoral thesis, Friedrich-Schiller University, Jena (DE), Mar. 29, 2017.
(DuBose 2019): T. B. DuBose et al. "Super-resolution retinal imaging using optically reassigned scanning laser ophthalmology", Nature Photonics, Vol. 13, April 2019, pages 257-262.
(Sandison 1995): D. R. Sandison et al. "Quantitative comparison of background rejection, signal-to-noise ratio, and resolution in confocal and full-field laser scanning microscopes" Applied Optics Vol. 34, No. 19, 1st July 1995, pages 3576-3588.
(Mueller 2010): C. B. Mueller, J. Enderlein "Image Scanning Microscopy", PRL 104, 198101 (2010).

The invention claimed:

1. A scanning confocal photon-reassignment microscope comprising: a light source configured to generate at least one spatially coherent illuminating light beam at an illumination wavelength; a first optical system configured to apply an angular scan to said illuminating light beam; at least one microscope objective configured to receive as input the illuminating light beam output from the first optical system and to focus it on a sample, and to collect and collimate a light beam elastically scattered by said sample, called a signal beam; a second optical system, which is able to coincide in whole or in part with the first optical system, and which is configured to receive as input the signal beam collimated by the microscope objective, to apply to it an angular scan opposite to that applied to the illuminating light beam and to focus it in a first focal plane; a pinhole arranged in said first focal plane; a third optical system configured to collect the signal beam having passed through the pinhole, to collimate it and to apply to it an angular scan synchronized with that applied to the illuminating light beam and such that the product of its amplitude and the cross-sectional area of the collimated light beam in the third optical system is greater than the product of the amplitude of the scan applied by the second optical system and the cross-sectional area of the collimated light beam in the second optical system, and to focus it in a second focal plane; and a matrix image sensor arranged in the second focal plane; characterized in that: an assembly consisting of the microscope objective, the second optical system and the third optical system is configured to focus on the matrix image sensor said signal beam at the illumination wavelength; and in that the pinhole has a diameter, or greatest lateral dimension, of between 2 and 4 Airy units.

2. The scanning confocal microscope as claimed in claim 1, wherein at least the second optical system comprises a beam splitter to split the signal beam from the illuminating light beam.

3. The scanning confocal microscope as claimed in claim 1, wherein the light source is configured to emit a blue, violet or near-ultraviolet illuminating light beam.

4. The scanning confocal microscope as claimed in claim 1, wherein the light source is a laser.

5. The scanning confocal microscope as claimed in claim 1, wherein the microscope objective is an immersion objective having a numerical aperture greater than or equal to 1.

6. The scanning confocal microscope as claimed in claim 1, wherein the third optical system is configured to apply to the signal beam an angular scan such that the amplitude of said scan multiplied by the cross-sectional area of the beam is between 1.8 and 2.2 times the product of the amplitude of the angular scan applied to the illuminating light beam by the first optical system and the cross-sectional area of said beam.

7. The scanning confocal microscope as claimed in claim 1, configured to operate in reflectance, wherein: the first optical system comprises a first lens to focus the illuminating light beam, a pinhole arranged in the focal plane of said first lens to perform spatial filtering of the illuminating light beam, a beam splitter to reflect a portion of said beam, a second lens to collimate said portion of the illuminating beam, a first oscillating mirror or system of oscillating mirrors to apply to it said angular scan and an afocal system comprising a third and a fourth lens; the second optical system comprises said afocal system, said first oscillating mirror or system of oscillating mirrors, said second lens and said beam splitter, the latter being configured to transmit a portion of the signal beam, backscattered by the sample; and the third optical system comprises a fifth lens to collimate the signal beam having passed through the pinhole, a second oscillating mirror or system of oscillating mirrors to apply to it said angular scan synchronized with that applied to the illuminating light beam and a sixth lens to focus it in the second focal plane.

8. The scanning confocal microscope as claimed in claim 7 configured to operate in reflectance, wherein the light source (SL') is configured to generate a plurality of said illuminating light beams in parallel, these propagating through the optical system, whereby the microscope objective collects a plurality of respective signal beams, which then propagate along said second optical system, and comprising a matrix array of pinholes arranged in said focal plane, one for each said backscattered light beam, and wherein: the light source comprises a first array of microlenses to generate and focus said plurality of illuminating light beams; the scanning confocal microscope comprises at least one oscillating mirror having a reflective front face and a reflective rear face, the front face forming part of the first and second optical system and the rear face forming part of the third optical system; and the third optical system comprises a second array of microlenses to increase the cross-sectional area of the backscattered light beams incident on the rear face of the oscillating mirror by a factor between 1.8 and 2.2.

9. The scanning confocal microscope as claimed in claim 1, wherein the light source is configured to generate a plurality of said illuminating light beams in parallel, these propagating through the first optical system, whereby the microscope objective collects a plurality of respective signal beams, which then propagate along said second optical system, and comprising a matrix array of pinholes (MP) arranged in said second focal plane, one for each backscattered light beam.

10. The use of a scanning confocal microscope as claimed in claim 1, to observe viral particles in suspension.

11. A method for observing a sample, comprising the steps of: generating at least one spatially coherent and collimated illuminating light beam at an illumination wavelength; applying to it an angular scan; focusing it on the sample by means of a microscope objective; collecting, by means of said or of another microscope objective, a light beam elastically scattered by the sample at said illumination wavelength, called a signal beam; applying to the signal beam an angular scan opposite to that applied to the illuminating light beam and focusing it in a first focal plane; carrying out spatial filtering of the signal beam by means of a pinhole arranged in said first focal plane, the pinhole having a diameter, or a greatest lateral dimension, of between 2 and 4 Airy units; collecting the signal beam having passed through the pinhole, collimating it and applying to it an angular scan synchronized with that applied to the illuminating light beam and such that the product of its amplitude and the cross-sectional area of the signal beam is greater than the product of the amplitude of the angular scan applied to the illuminating light beam and its diameter and focusing it in a second focal plane; and detecting the signal beam by means of a matrix image sensor arranged in the second focal plane.

\* \* \* \* \*